Feb. 4, 1969          A. J. HARVEY          3,425,543
                   PACKAGED TRAY OF ARTICLES
Filed Oct. 4, 1965                                Sheet 1 of 6

INVENTOR
ALBERT JOHN HARVEY
By: Jacobs & Jacobs
His attorneys

INVENTOR
ALBERT JOHN HARVEY
By: Jacobs & Jacobs
His attorneys

Feb. 4, 1969   A. J. HARVEY   3,425,543
PACKAGED TRAY OF ARTICLES
Filed Oct. 4, 1965   Sheet 3 of 6

INVENTOR
ALBERT JOHN HARVEY
By: Jacobs & Jacobs
His attorneys

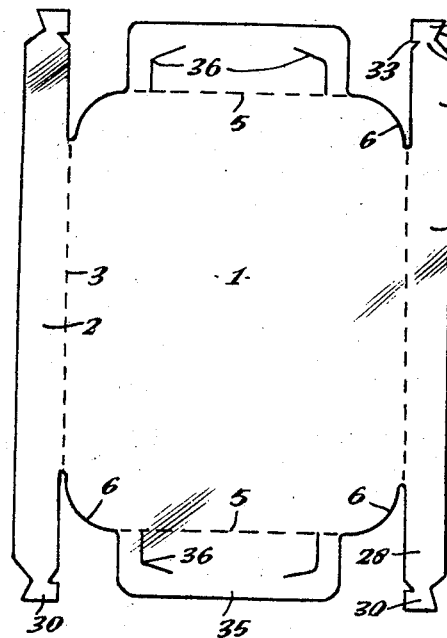
Fig.10.
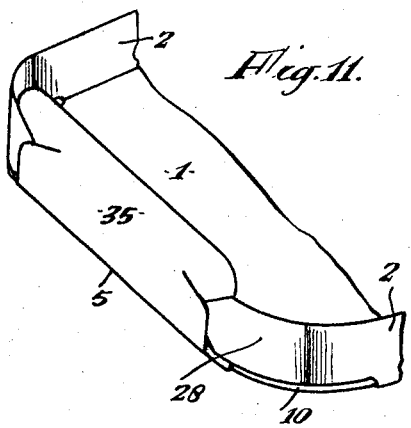
Fig.11.
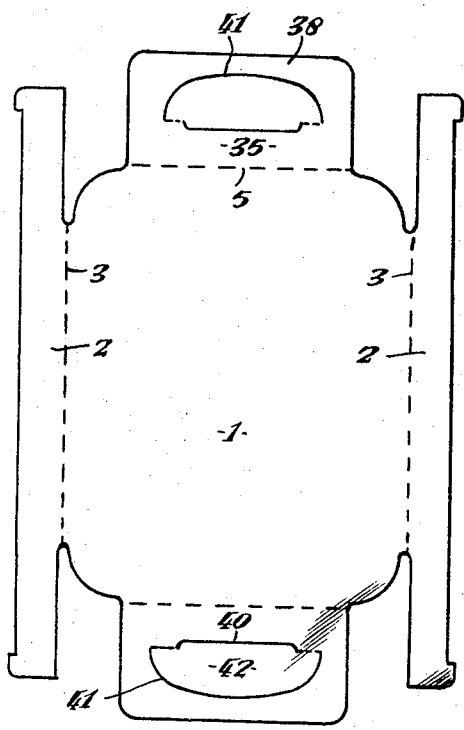
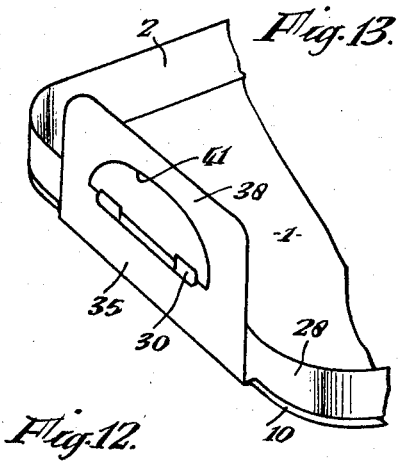
Fig.13.
Fig.12.
INVENTOR
ALBERT JOHN HARVEY
By: Jacobs & Jacobs
His attorneys INVENTOR
ALBERT JOHN HARVEY
By: Jacobs & Jacobs
His attorneys

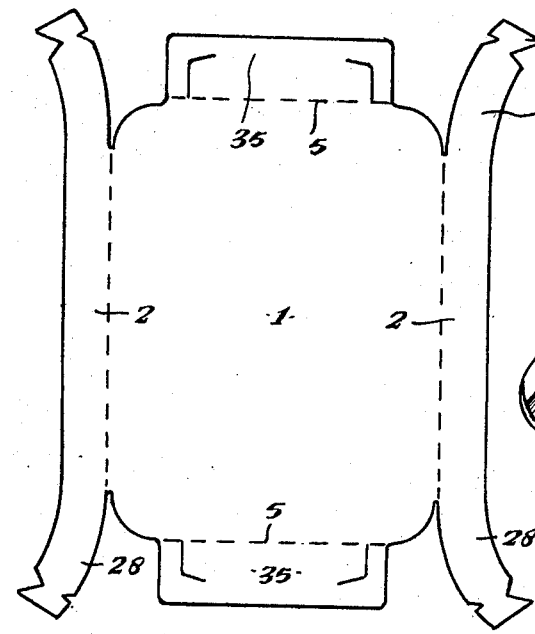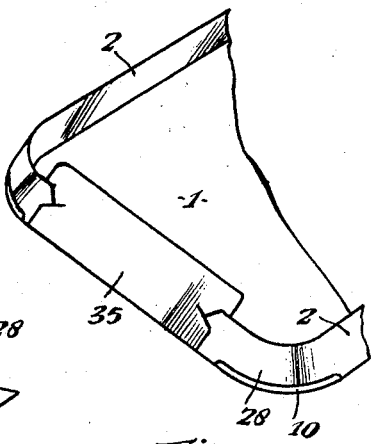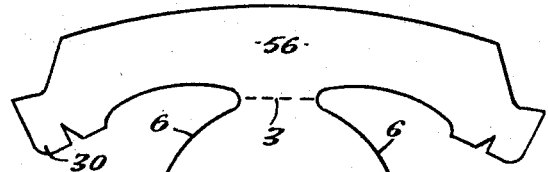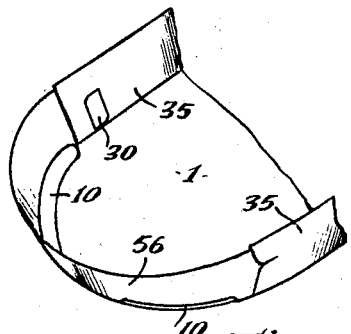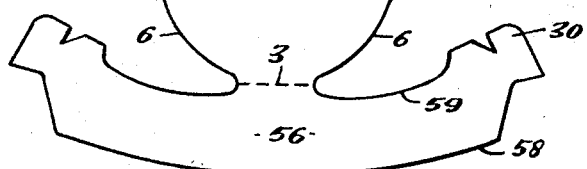
INVENTOR
ALBERT JOHN HARVEY

United States Patent Office

3,425,543
Patented Feb. 4, 1969

3,425,543
PACKAGED TRAY OF ARTICLES
Albert John Harvey, Bristol, England, assignor to Allen Davies & Company Limited, Bristol, England, a company of Great Britain and Northern Ireland
Filed Oct. 4, 1965, Ser. No. 492,640
Claims priority, application Great Britain, Oct. 13, 1964, 41,780/64
U.S. Cl. 206—65           11 Claims
Int. Cl. B65d 85/62, 65/16, 5/46

ABSTRACT OF THE DISCLOSURE

This application deals with a package made from a blank of cardboard or similar material stamped out to provide a base and walls with extensions which cooperate with adjacent walls to hold the tray in position. The entire tray and contents to be packaged are then completely enclosed in a flexible heat shrinkable thermoplastic film material.

---

This invention relates to a package and means and a method for making it.

The articles in the packages made according to this invention are those which have bottoms to stand upon and wall profiles which are not rectilinear for example cylindrical cans, jars, bottles and the like. Such articles are referred to in this specification and claims as articles of the kind described.

Packages containing articles of the kind described have been proposed in which a set of these articles are arranged on a backing board and a layer of heat shrinkable film material is shrunk around them to make a compact handleable unit. The periphery of the backing board generally conforms to the shape of the set of articles standing upon it. Once the film is removed the articles cannot easily be lifted on the backing board. This difficulty can be overcome by placing the articles on a tray before wrapping and proposals have been made to do this using trays of conventional rectangular shape. Packages made with such trays suffer from the disadvantage that a really tight package does not result and the articles can move relatively to each other during handling. This is due to the pressure of the walls of the tray preventing the shrunk film from contacting and confining the articles in close proximity to each other.

Specially shaped moulded trays have been proposed which make a tight package with heat shrinkable material. Such trays are of robust construction having rigid walls which do not collapse when the film is applied and shrunk to form the package. In order to obtain this rigidity projections are provided in the walls of the tray making the finished package cumbersome.

We have found that the disadvantage of packages made with the trays mentioned above can be overcome by providing the tray with flexible wall corner portions, these corner portions being unattached to the base of the tray so that they are free to conform to the contour of the walls of the contained articles and form with the walls of the tray a closely fitting band around the set of articles when the heat shrinkable film has been applied and is shrunk about the tray and articles.

According to this invention we provide a package comprising a tray of cardboard or like material with generally rounded corners, a set of articles of the kind described on the tray and a wrapper of heat shrinkable thermoplastic film material shrunk about the tray and articles, the said tray having a substantially rectangular base with truncated corners and a peripheral wall, the corner portions of the said wall being unattached to the base and flexible to conform to the contour of the articles in the corners of the tray, the said shrunk wrapper causing the said peripheral wall to fit closely against the contained articles.

The invention also comprises a package comprising a tray with generally rounded corners, a set of articles on said tray and a wrapper of heat shrinkable thermoplastic film material shrunk about the tray and articles, the said tray being formed from a blank of cardboard or like material having a substantially rectangular base forming area with truncated corners and having at each side a wall forming panel attached to the base forming area through a line of weakening, at least two said wall forming panels terminating in free end portions each joinable to and adjacent wall panel, each said free end portion starting from a position short of the said adjacent wall, the said wall forming panels being bent angularly about the lines of weakening to form walls of the tray and the free end portions forming flexible generally rounded wall corner portions.

The means for making the package comprises an open topped tray formed from a blank of cardboard or like material comprising a substantially rectangular base forming area with truncated corners and having at each side a wall forming panel attached to the said base forming area through a line of weakening, at least two of said wall forming panels having free end portions joinable to adjacent wall forming panels, said free end portions providing when the tray is erected flexible rounded wall corners, a space being provided between the corners of the base of the tray and the said rounded wall corners.

The truncated corners of the base are usually rounded and shaped to the profile of the walls of articles to be packaged but they can be inset more than this, either by a curved or straight outline provided that the bottoms of the articles are still supported by the base. The corners of the base must not project outwards beyond the flexible wall corner portions when the tray is in the erect position.

The flexible wall corner portions may be formed as extensions on all the wall forming panels or on two only of the wall forming panels and the said wall corner portions are attached to adjacent wall corner portions or to adjacent wall panels by interlocking, stitching, or adhering. The walls of the tray may be perpendicular, sloping outwards or inwards, or sloping first outwards and then inwards.

The said spaces between the truncated corners of the base and the wall corners are provided either by cutting back still further the truncated corners of the base and/or by cutting away the bottom edge of each wall corner portion. One of the purposes of the tray is to collate the set of articles while being wrapped in the heat shrinkable material.

The invention is illustrated in the accompanying drawings wherein:

FIGS. 10, 12, 14, 16, 18 and 20 are blanks of various modifications of tray, and FIGS. 11, 13, 15, 17, 19 and 21 are perspective views of parts of the trays made from the blanks shown in FIGS. 10 to 20 respectively.

Figure 1:
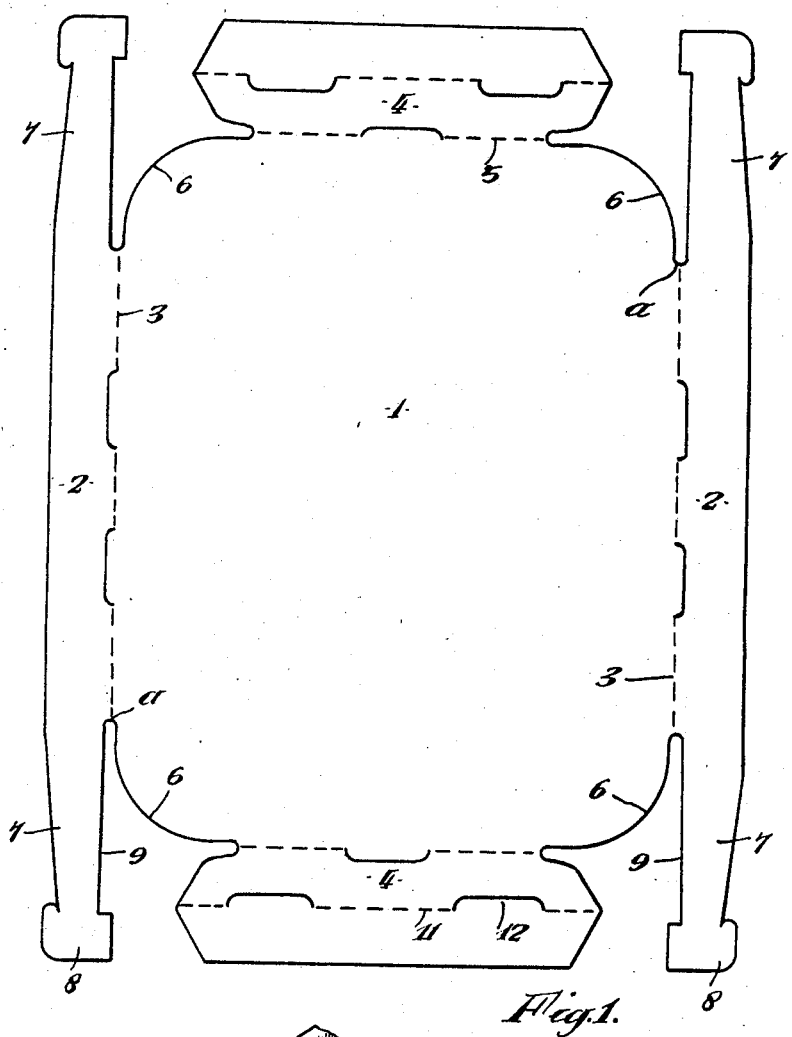
FIG. 1 is a blank of a tray made in accordance with this invention.

The blank shown in FIG. 1 is formed of sheet cardboard and has a base forming area 1 substantially rectangular in plan. Wall forming panels 2 and 4 are joined to the base forming area 1 through lines of weakening 3 and 5 respectively. Cuts may be made at intervals in the lines of weakening 3 and 5 to allow for the ready bending of the wall forming panels when the tray is erected.

The corners of the base forming area 1 are truncated or retrenched and formed as rounded corners 6 and the wall forming panels 2 are each provided with free end portions 7 forming wall corner portions which start from a position marked a, short of the crease line 5. In other words the crease line 3 is of less length than the distance between the two crease lines 5. These portions 7 terminate in enlarged tabs 8. The inner edge 9 of each portion 7 is offset from but parallel to the lines of weakening 3 to provide a space 10 between the corner 6 of the base and the wall corners when the tray is erected.

The wall forming panels 4 are each provided with a line of weakening 11 from which extended tabs 12 cut out of the material of the panels 4.

Figure 2:
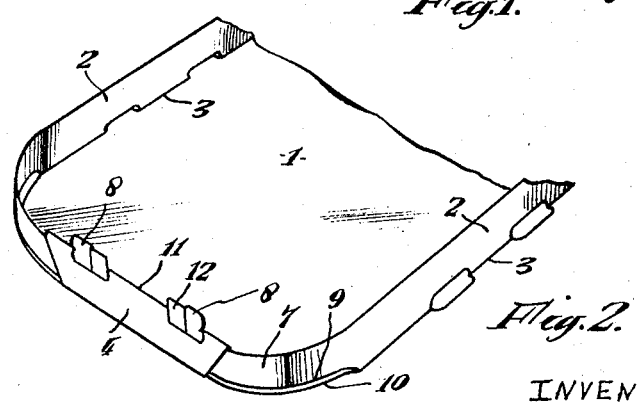
FIG. 2 is a perspective view of part of a tray made with the blank shown in FIG. 1.

FIG. 2 shows the tray in the erected position comprising a base and peripheral wall. The wall forming panels 2 and 4 have been bent about the lines of weakening 3 and 5 and the panels 4 have been bent about their crease lines 11 to form double walls. The tabs 8 have been made to engage the holes formed by the tabs 12 to hold the walls of the tray in the erected position. The tabs 8 make a loose fit in the holes so that the portions 7 can move relatively to the walls 4 if desired.

Figure 3:
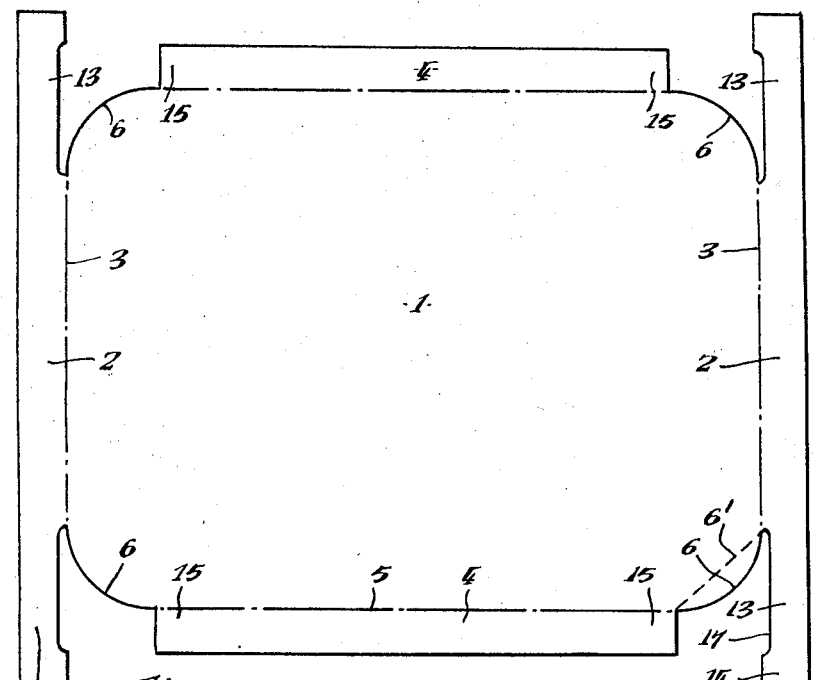
FIG. 3 is a modified form of blank.

The blank which is shown in FIG. 3 has a substantially rectangular base forming area 1 to which are attached wall forming panels 2, 4, attached through lines of weakening 3, 5, as for the embodiment of the FIG. 1. This time, however, extensions 13 are provided at each end of the two shorter wall forming panels 2. The extensions 13 are of a length sufficient to be brought round to have an end portion 14 stapled or otherwise secured to the end portion 15 of an adjacent wall 4.

The base forming area 1 has rounded corners 6. The line of the ends of the curve of the corners 6 is asymptotic to the lines of weakening 3, 4, and a space or gap 10 is provided between an edge of the extension portion 13 and the base forming area of the tray (when the tray is set up) by relieving the extension portion 13 at 17.

Figure 4:
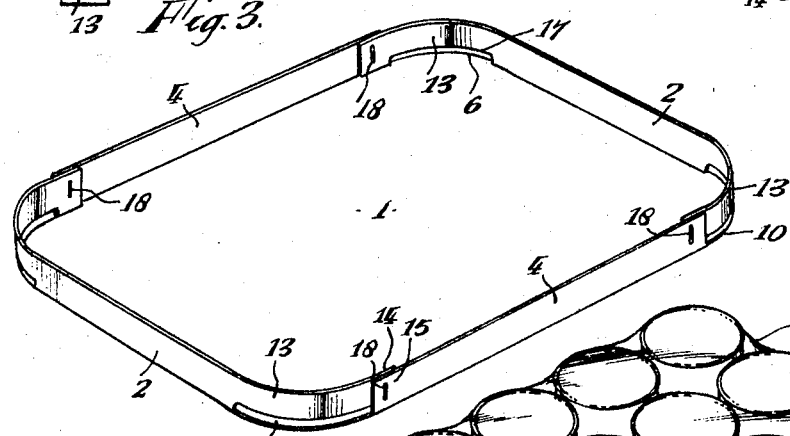
FIG. 4 is a perspective view of a tray made in accordance with the blank of FIG. 3.

A tray set up from the blank of FIGURE 3 is shown in FIGURE 4. The walls 2, 4 have been bent up perpendicular to the plane of the base forming area 1 and the extensions 13 have been bent round following the curve of the corner 6, and staples 18 have been inserted to secure the end portions 14 of the extensions 13 to the end portions 15 of adjacent walls.

Although extension portions 13 have been shown of a length sufficient to form the whole corner attached to a shorter wall, extension portions may be provided on any two or four of the side wall forming panels and may be of any length on each wall, provided that at each corner of the tray there is at least sufficient extension length in total to form a satisfactory rounded corner. Relieving either the base forming area or the bottom of the extension to form a gap between the nearmost edge of the extension and the part of the base forming area nearest it may be effected in any of these forms of extension. The base forming area need not have a rounded corner for example it may have a straight corner as shown in dotted lines at 6' FIG. 3.

Figure 5:
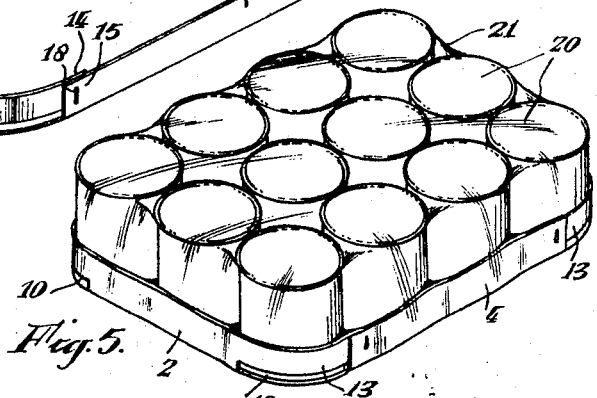
FIG. 5 is a perspective view of a package of articles the tray being that shown in FIG. 4.
Figure 6:
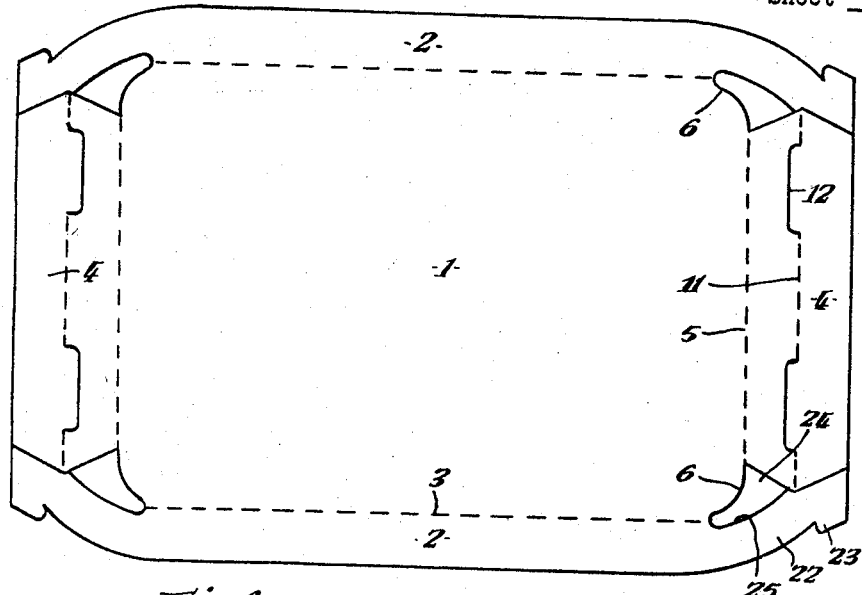
FIG. 6 is a blank of a modified form of tray.
Figure 7:
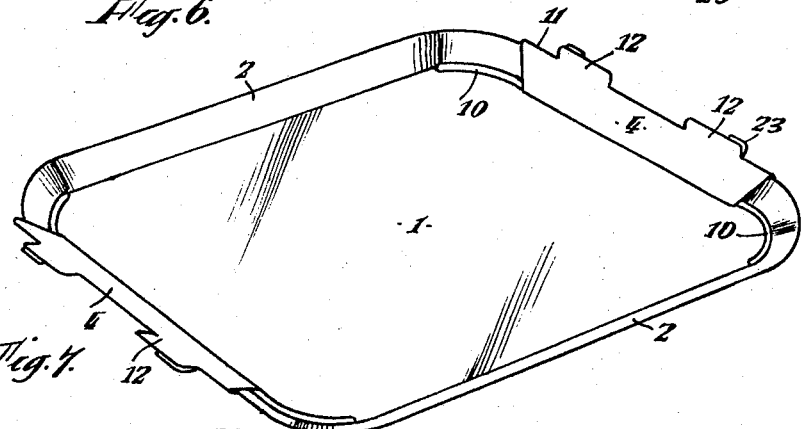
FIG. 7 is a perspective view of the tray shown in FIG. 6.
Figure 8:
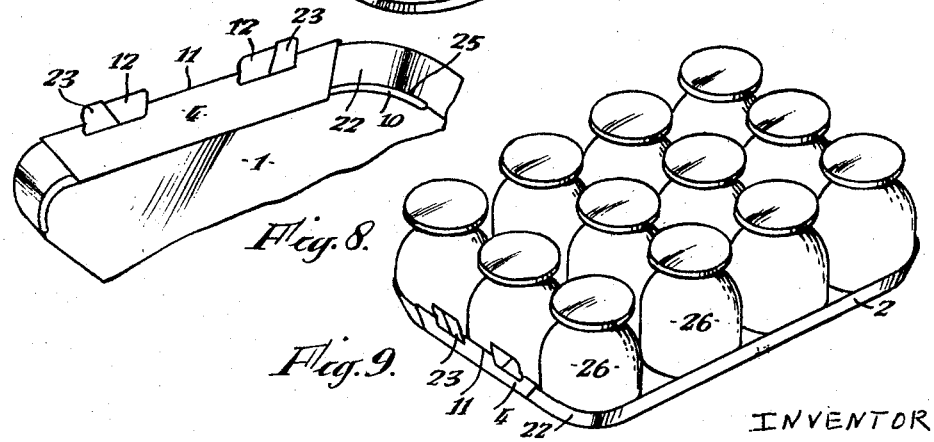
FIG. 8 shows an underneath perspective view of the tray show nin FIG. 7.
Figure 9:
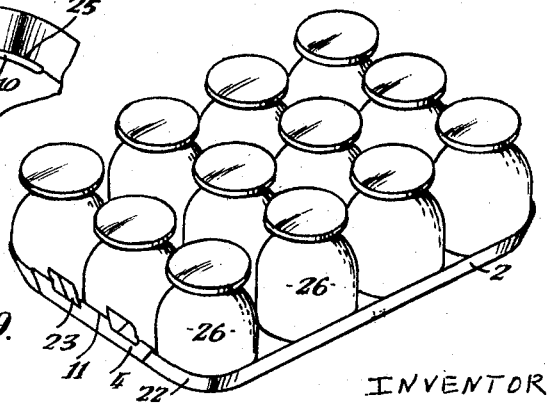
FIG. 9 is a perspective view of articles placed in the tray shown in FIG. 7.

In FIG. 5 there is shown a tray (which is actually that illustrated in FIG. 4, but could be any tray according to the invention), in which there have been packed a plurality of articles of the kind described. Articles to be packed in the tray are placed in the tray in an array in the way shown in FIG. 5. The articles shown in FIG. 5 are assumed to be cylindrical paint tins 20 which are of a diameter to fit three abreast in the tray with the upper ends of the tins extending above the tops of the walls 2, 4 of the tray, and the radius of curvature of the rounded wall corner portions formed by the extensions 13 is the same as the wall radius of the tins. In this manner the rims of tins placed on the base do not interfere with the wall corners conforming to the surfaces of the cylindrical tins. In the case of bottles and jars the flexible corners can be made to fit around walls which project beyond the base of the jar. A wrapper 21 of flexible heat shrinkable thermoplastic film material, for example polyethylene, is enfolded around the tray and its contents and is sealed and inserted into a shrink tunnel in known manner. The shrunk wrapper draws the flexible walls 2 and 4 against the tins 20 and forms with the wall corners a closely fitting band conforming to the wall profile of the set of articles. The shrunk wrapper closely embraces the tops of the articles and the exposed sides of the articles engaged by the walls 2, 4 and so maintains the articles within the tray tightly packed in it and by virtue of this gives strength to the tray since the walls 2 and 4 act to reinforce the edges of the base against bending. The package thus formed is compact and easy to handle and when the wrapper is removed the tins are still contained in the tray for subsequent handling, such for example as conveyance to positions at which the articles are removed from the tray and stacked for purposes of display.

The construction shown in FIGS. 6–9 is similar to that shown in FIGS. 1–2 but the walls of the erected tray slope outwards. The tray comprises a base forming area 1 having one pair of opposed walls 2 each joined to the base forming area through a line of weakening 3 and one pair of opposite double walls 4 each joined to the base forming area 1 by a line of weakening 5. The lines of weakening 3 and 5 are preferably formed by half cuts at intervals separated by creases. The free end portions 22 of the wall panels 2 are curved inwardly and terminate in lugs 23. The blank has an aperture 24 at each corner and the inner edge of the portions 22 are cut back as indicated at 25. The curved corners 6 of the base 1 are also cut back from the crease line 3.

The articles to be packaged are glass jars. The sloping walls 2 and 4 are drawn snugly against the lower parts of the walls of the jars 26 by the shrunk wrapper.

According to the modification shown in FIGS. 10 and 11 the blank comprises a base portion 1 and wall forming portions 2 attached to the base forming portion by lines of weakening 3, the said wall forming portions 2 having reduced end portions 28, each of which terminate in a tab 30 joined to the portion 28 through a neck 32 which has two edges 33 and 34. Two other opposite wall forming panels 35 are joined to the base forming part 1 through lines of weakening 5, said panels 35 having cuts 36. To erect the tray the wall forming panels 2 and 35 are bent through the lines of weakening into the position where they form walls and the end portions 28 are curved around so that the tabs 30 can engage the cuts 36. The tabs 30 are prevented from disengagement by the edges 35 and 34 bearing on the edges of the cuts 36. This allows a slight movement of the walls 2 and 35 towards and away from each other without disengagement whereby the peripheral wall of the tray can be drawn tightly about the articles when the shrink wrap film is shrunk on. This form of lock is suitable for tray filling machinery and such condition is seen in FIG. 11.

As in the previous examples a space 10 is provided between the rounded corners 6 of the base 1 and the rounded wall corners formed by the extensions 28.

In the construction shown in FIGS. 12 and 13 the arrangement is somewhat similar to that shown in FIGS. 10 and 11 only in this case a handle is provided at each end of the tray. The wall forming panels 35 are extended to form handles 38 by means of the lines of weakening 40 and cuts 41 which form the flaps 42. If desired only one handle is provided.

In order to erect the tray the free end portions 30 are made to engage the edge of the hole formed by turning down the flaps 42. The loaded tray can be lifted by the handles so formed and when wrapped in heat shrinkable material one handle may be accessible through a hole in the wrapping material.

Figure 14:
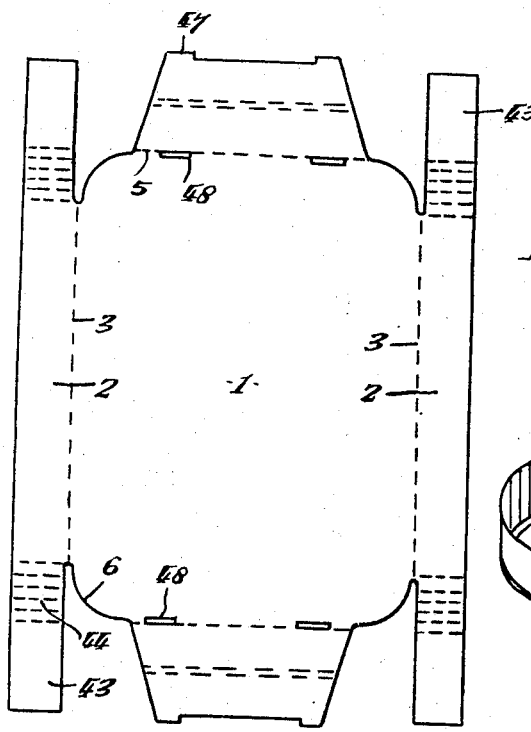
Figure 15:
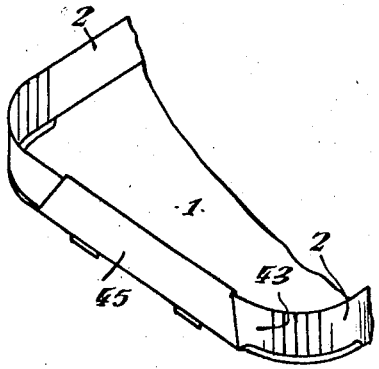

The construction shown in FIGS. 14 and 15 illustrate the case where the walls have no interlocking parts. As before the base 1 is provided with wall forming panels 2, the free end portions 43 of which are provided with crease lines 44 to facilitate bending, the extensions 43 are sandwiched between the double walls 45, the inner panel of which has tabs 47 which engage slots 48 provided in the base 1 in a conventional manner. Again a space 10 is provided between the rounded corners 6 of the base 1 and the rounded corners of the tray.

In a modification of the tray not illustrated, all the walls of the tray and the wall corners are double.

Figure 16:
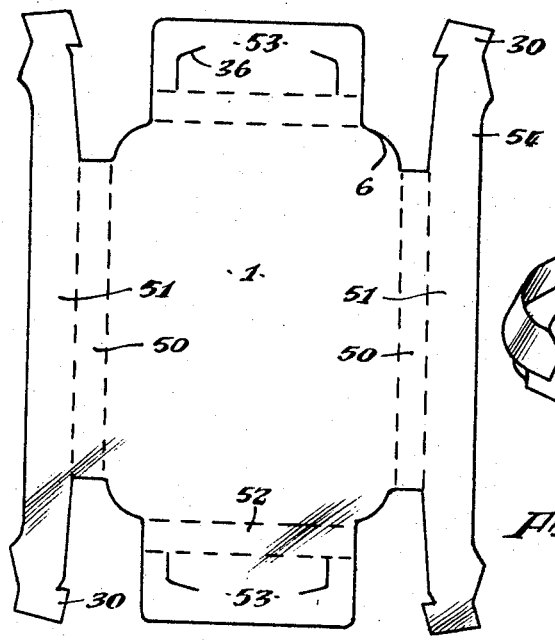
Figure 17:
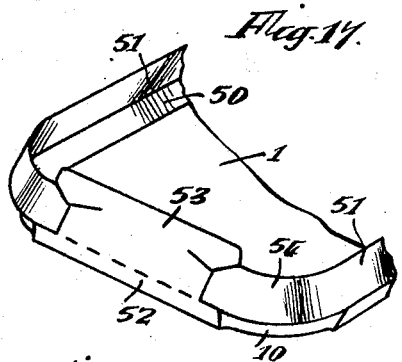

The form of the invention illustrated in FIGS. 16 and 17 show the case where the walls of the tray first extend outwards and then inwards. Each wall forming panel is provided by panels 50 and 51 forming two opposite walls and the panels 52 and 53 forming the two other opposite walls of the tray. The face end portions 54 which are extensions of the panels 51 are made to engage with the panels 53 in the same way as that described with reference to FIGS. 10 and 11. It will be noticed that the extensions 54 in the blank are splayed outwards. It should be understood that the wall panels 50 and 52 can be upright instead of sloping outwards by altering the length of the free end portions 54. The gap 10 is greater than those previously described.

The form of the tray shown in FIGS. 18 and 19 is similar to that shown in FIGS. 10 and 11, but the end portions 28 are extended outwardly thereby forming a tray with inwardly sloping walls. This kind of tray would be suitable for bottles in which the bottom portions are larger than the rest.

The form of tray shown in FIGS. 20 and 21 shows an arrangement for one row of jars only. The construction of interlocking is the same as that as shown in FIGS. 10 and 11. In this case the wall panels 35 with the cuts 36 are the longer panels and the panels 56 having locking tabs 30 for engaging the cuts 36. The outer edges 58 are curved and the inner edges 59 are cut back and curved.

The material of the tray can be cardboard of varying thicknesses to suit the particular circumstances or corrugated board or paper or sheet plastics and if desired the free end portions are creased or provided with bends in order to facilitate forming the curvature at the corners. If corrugated board or paper is used this must have sufficient flexiblity to allow the wall corner portions and the walls to conform to the set of articles in the tray for example one suitable corrugated board is that known as E-flute i.e.: 16 corrugations to the inch.

If required a separate liner of corrugated cardboard may be provided on the base of the tray, said liner having recesses to receive the bottoms of the articles to be packaged and acting as a spacer. Other means may be provided for locating the articles on the tray.

Although the invention has been described with reference to a package consisting of a tray with a single layer of articles all shrink wrapped in heat shrinkable wrapper, if required two or more tiers of articles are arranged one above the other on one tray, the bottoms of one tier standing on the tops of the tier below, the whole being shrink wrapped in film. Alternatively each tier of articles is on a separate tray, the said trays being stacked one above the other and shrink wrapped together in the wrapper. The space provided between the trays is accessible as a handle when end holes are provided in the shrunk wrapper.

In all the cases described above an inverted tray can be applied to the tops of the articles before wrapping. The inverted tray can be of the same size, smaller or larger than the bottom tray depending upon the shape of the packaged articles.

The advantages of the package made according to the invention are as follows:

(1) The flexible corners contour to match the curvation or shape of the corner unit.

(2) Forms a highly convenient multi-unit transit and display package, and provides protection against pilfering and dust.

(3) Full visibility for sales appeal.

(4) Palletisation.

(5) Freedom from right-angled corners where the risk of corner collapse would give undesirable looseness of film overwrap.

What I claim and desire to secure by Letters Patent is:

1. A package comprising a tray of cardboard of sheet-like material for retaining a plurality of articles, said tray comprising a substantially rectangular base with truncated corners, two walls having extensions therefrom which are flexible and conformable and unattached from the base, two other walls securable to said side walls, means for attaching said extensions to said side walls to produce conformability around the articles to be retained and a shrinkable film enclosing said tray and said articles, whereby the walls are held closely against the articles by the film.

2. A package comprising a tray of cardboard or sheet-like material for retaining a plurality of articles, said tray comprising a substantially rectangular base with truncated corners, two walls having attaching means extending therefrom and two other walls having receiving means, the attaching means being unattached from the base, flexible and conformable around the articles to be retained and a shrinkable film enclosing said tray and said articles whereby the walls are held closely against the articles by the film.

3. A package according to claim 1 wherein the extensions are spaced apart from the base of the tray.

4. A package according to claim 1 wherein said walls are attached to said base through a vertical contoured member.

5. A package according to claim 2 wherein the extensions terminate in enlarged tabs and said two other walls have slits therein for receiving said tabs.

6. An open topped tray of cardboard or sheet-like material for retaining a plurality of articles, said tray comprising a substantially rectangular base with truncated corners, two walls having attaching means extending therefrom and being unattached from the base and two other walls having receiving means, the attaching means being flexible and conformable around the articles to be retained.

7. An open topped tray according to claim 6 wherein said walls are attached to said base through a vertical contoured member.

8. An open topped tray according to claim 6 wherein the attaching means terminate in enlarged tabs and said two other walls have slits therein for receiving said tabs.

9. A package according to claim 2 wherein said two other walls comprise a double walled construction.

10. A package according to claim 1 wherein two opposite walls have handle means integral therewith.

11. A package according to claim 1 wherein said two walls and said two other walls are at different inclinations to the vertical with regard to one another.

References Cited

UNITED STATES PATENTS

| | | | |
|---|---|---|---|
| Re. 23,871 | 9/1954 | Castle | 220—115 |
| 1,613,282 | 1/1927 | Mayhew. | |
| 3,118,537 | 1/1964 | Copping. | |
| 3,143,210 | 8/1964 | Heydon. | |
| 2,249,881 | 7/1941 | Bouchelle. | |
| 2,660,363 | 11/1953 | Trickett et al. | 229—35 |
| 3,319,783 | 5/1967 | Henrici et al. | |
| 3,331,503 | 7/1967 | Brown. | |

WILLIAM T. DIXSON, JR., *Primary Examiner.*

U.S. Cl. X.R.

206—45.33; 229—35, 52